United States Patent
Verthein et al.

(10) Patent No.: US 10,778,728 B2
(45) Date of Patent: Sep. 15, 2020

(54) COGNITIVE RESOURCE SELECTION

(71) Applicant: Microsoft Technology Licensing, LLC, Redmond, WA (US)

(72) Inventors: William G. Verthein, Sammamish, WA (US); Amer Hassan, Kirkland, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 265 days.

(21) Appl. No.: 15/368,412

(22) Filed: Dec. 2, 2016

(65) Prior Publication Data
US 2018/0159903 A1 Jun. 7, 2018

(51) Int. Cl.
*H04L 12/18* (2006.01)
*H04L 29/06* (2006.01)
(Continued)

(52) U.S. Cl.
CPC ...... *H04L 65/1069* (2013.01); *H04L 12/1827* (2013.01); *H04L 12/1877* (2013.01); *H04L 65/1046* (2013.01); *H04L 65/1089* (2013.01); *H04L 65/403* (2013.01); *H04L 65/60* (2013.01); *H04L 65/602* (2013.01); *H04L 65/80* (2013.01); *H04L 67/306* (2013.01); *H04L 69/24* (2013.01);
(Continued)

(58) Field of Classification Search
CPC ............. H04L 65/1069; H04L 12/1877; H04L 65/403; H04L 65/1089; H04L 65/602; H04L 65/1046; H04L 67/306; H04L 12/1827; H04L 65/80; H04L 69/24; H04L 65/60; H04M 3/56; H04M 3/51; H04M 2203/406; H04M 2203/555
See application file for complete search history.

(56) References Cited

U.S. PATENT DOCUMENTS 8,019,782 B2 9/2011 Song et al.
8,438,283 B2 5/2013 Chen et al.
(Continued)

FOREIGN PATENT DOCUMENTS

WO 2015094039 A1 6/2015

OTHER PUBLICATIONS

"International Search Report and Written Opinion Issued in PCT Application No. PCT/US2017/063216", dated Feb. 12, 2018, 14 Pages.
(Continued)

*Primary Examiner* — Oanh Duong
(74) *Attorney, Agent, or Firm* — NovoTechIP International PLLC

(57) ABSTRACT

The patterns of usage, participation, and/or item sharing by the participants in a conference call are correlated, recognized, and used to select a data centers. This selection can be done both before and/or during a call. When significant patterns are recognized (e.g., heavy video sharing by one participant at every Friday afternoon meeting) there may be a better (e.g., faster, better quality, more efficient, less use of network resources) data center to host the call than one that is selected based on the geography of the participants alone. Likewise, during a call, other patterns of behavior can be correlated and recognized dynamically such that when these patterns occur, the call is hosted by a different (i.e., better) data center.

20 Claims, 9 Drawing Sheets

(51) Int. Cl.
*H04M 3/51* (2006.01)
*H04L 29/08* (2006.01)
*H04M 3/56* (2006.01)

(52) U.S. Cl.
CPC .............. *H04M 3/51* (2013.01); *H04M 3/56* (2013.01); *H04M 2203/406* (2013.01); *H04M 2203/555* (2013.01)

(56) References Cited

U.S. PATENT DOCUMENTS

| | | | |
|---|---|---|---|
| 8,526,336 B2 | 9/2013 | Sarkar et al. | |
| 8,817,668 B2 | 8/2014 | Sekaran et al. | |
| 9,083,757 B2 | 7/2015 | Zhang et al. | |
| 9,215,414 B2 | 12/2015 | Aziz | |
| 2003/0023672 A1* | 1/2003 | Vaysman | H04L 12/1827 709/203 |
| 2006/0053196 A1* | 3/2006 | Spataro | G06Q 10/107 709/205 |
| 2006/0056602 A1* | 3/2006 | Bushey | G10L 15/063 379/88.04 |
| 2007/0165820 A1 | 7/2007 | Krantz et al. | |
| 2008/0063173 A1* | 3/2008 | Sarkar | H04L 12/1827 379/202.01 |
| 2010/0014511 A1* | 1/2010 | Ezerzer | H04L 41/0893 370/352 |
| 2012/0020473 A1* | 1/2012 | Mart | H04L 51/14 379/265.09 |
| 2012/0317485 A1 | 12/2012 | Ding et al. | |
| 2013/0144603 A1 | 6/2013 | Lord et al. | |
| 2013/0210400 A1* | 8/2013 | Rhee | H04M 1/72583 455/416 |
| 2014/0136685 A1 | 5/2014 | Chan et al. | |
| 2014/0267571 A1 | 9/2014 | Periyannan et al. | |
| 2014/0280595 A1 | 9/2014 | Mani et al. | |
| 2015/0128069 A1* | 5/2015 | Ouyang | H04L 65/403 715/753 |
| 2015/0135094 A1* | 5/2015 | Donneau-Golencer | H04L 12/1886 715/752 |
| 2015/0312375 A1* | 10/2015 | Valey | G06F 3/0485 709/203 |
| 2015/0358171 A1 | 12/2015 | Rosenberg | |
| 2016/0256775 A1* | 9/2016 | Gustafson | A63F 13/493 |
| 2016/0366203 A1* | 12/2016 | Blong | H04L 51/32 |
| 2017/0093935 A1* | 3/2017 | Caston | G06F 3/04842 |
| 2018/0011678 A1* | 1/2018 | Shipper | G06F 3/0482 |
| 2018/0121828 A1* | 5/2018 | Keysers | G06N 99/005 |
| 2018/0124249 A1* | 5/2018 | Hassan | H04M 3/56 |
| 2018/0139253 A1* | 5/2018 | Ruetschi | H04L 65/1073 |

OTHER PUBLICATIONS

"Polycom® Video Collaboration Architecture Overview", Retrieved on: Sep. 12, 2016 Available at: http://www.polycom.co.in/content/dam/polycom/common/documents/guides/polycom-video-architecture-overview-sales-guide-enus.pdf.

"Office Action Issued in European Patent Application No. 17809152.6", dated Mar. 12, 2020, 7 pages.

* cited by examiner

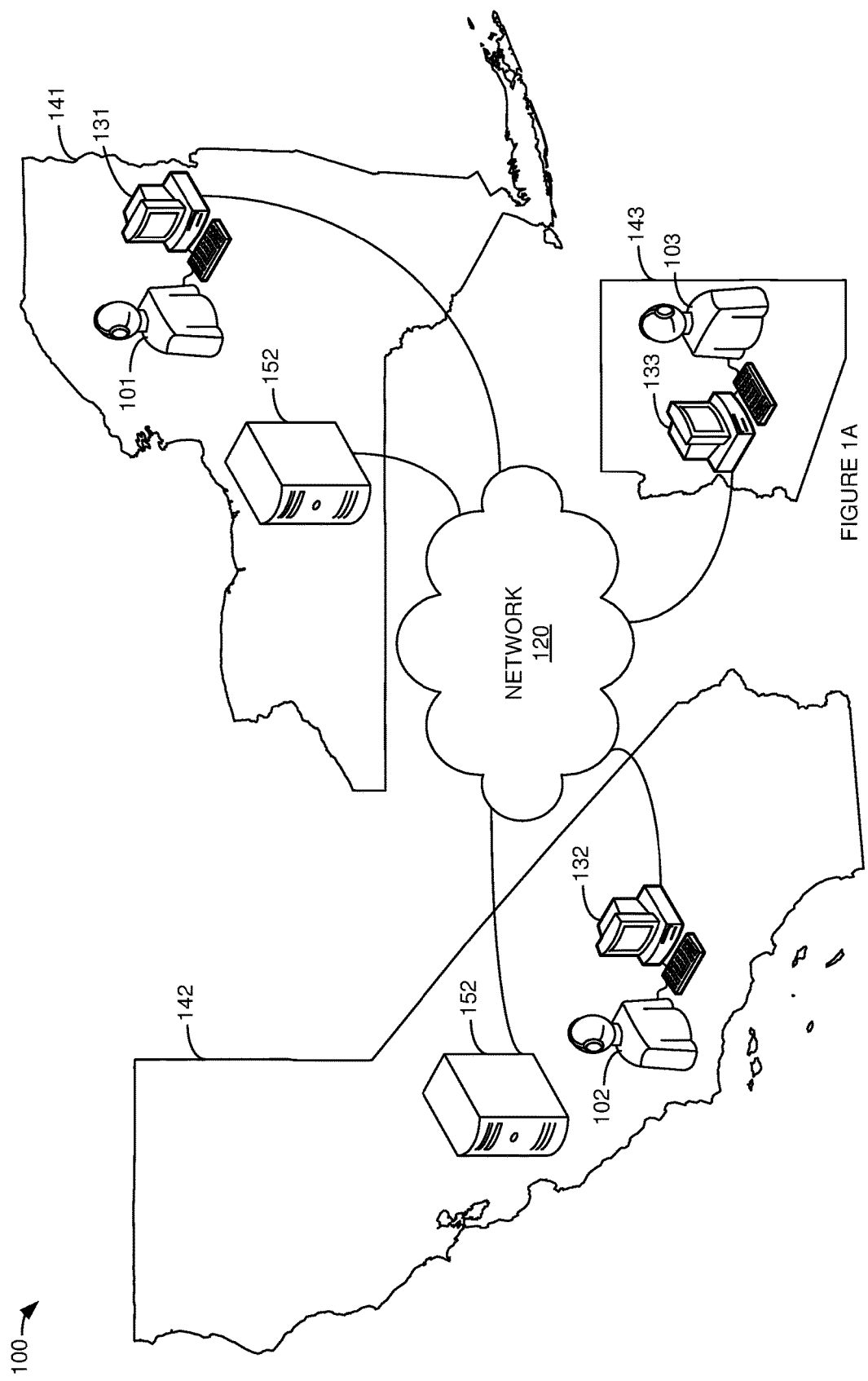

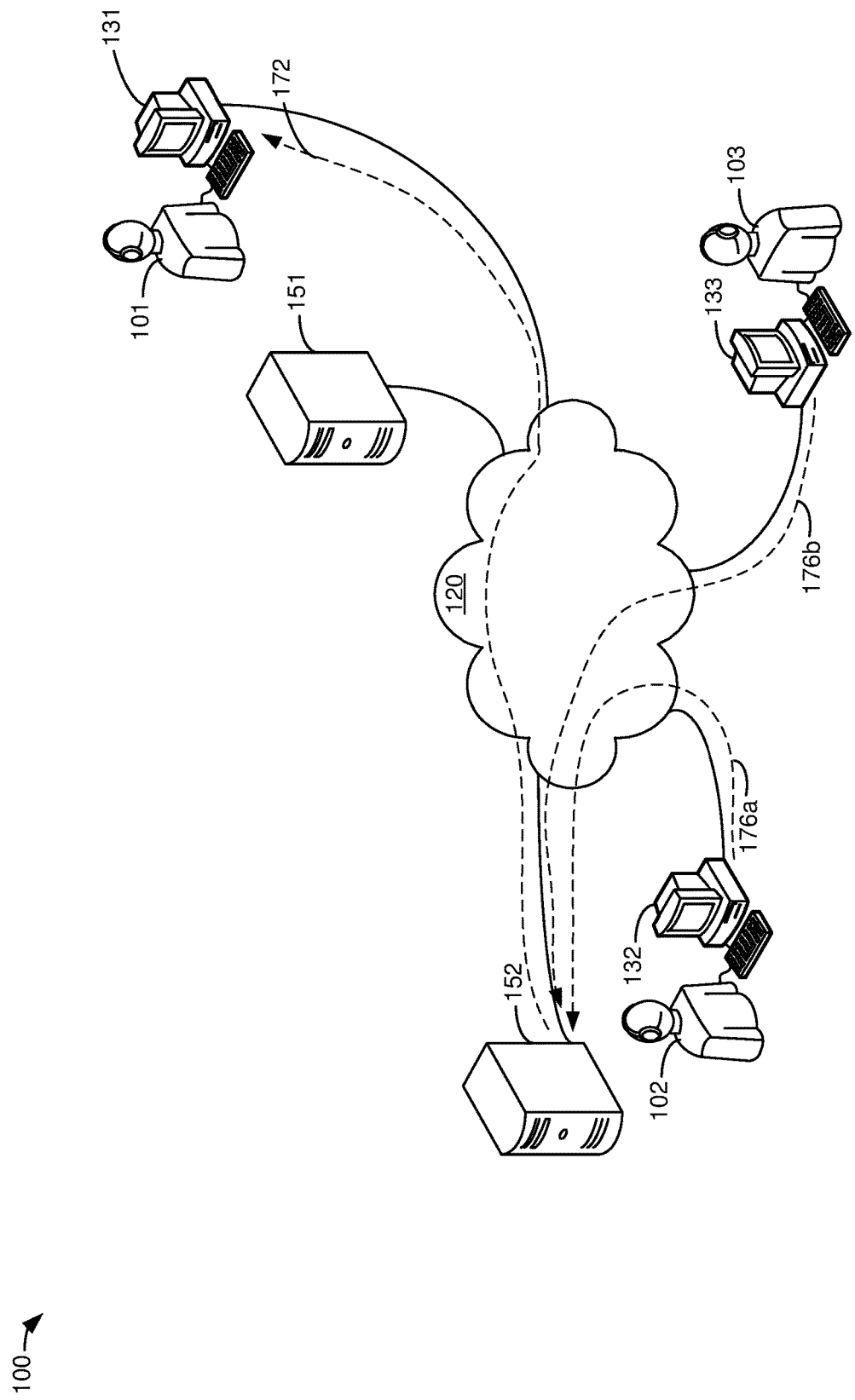

COGNITIVE RESOURCE SELECTION

BACKGROUND

Online conferencing (a.k.a., web conferencing and/or internet conferencing) systems have an array of capabilities including voice/video communications, instant messaging, data/application sharing, and white-boarding. These online collaborative service systems enable users to engage in communication sessions to exchange different types of communication media, such as voice data, video data, content sharing, and combinations thereof. Some conferencing systems enable users to share and collaborate in creating and modifying documents or other shared content. Online conferencing typically allows real-time point-to-point communication as well as multicast communications (i.e., from one sender to many receivers.) Some services offer data streams of voice and/or video chat to be shared simultaneously, across geographically dispersed locations. Applications for online conferencing include meetings, training events, lectures, and presentations.

SUMMARY

Examples discussed herein relate to a communication system that includes a first data center of a plurality of data centers and a selections system. The first data center is configured to host a media communication session. The selection system is to, based at least in part on a first participant history associated with a first participant in the media communication session, a second participant history associated with a second participant in the media communication session, and a context history associated with the media communication session, select the first data center to host the media communication session.

In an example, a method, performed by one or more computing devices includes receiving a plurality of media items over a span of time that pertain to interactions between at least a first participant and a second participant. The method also includes analyzing the media items to determine characteristics of the media items, to provide analysis results. The method also includes determining, based on at least the analysis results indicating a previous pattern of media item communication during previous conference calls, that the first participant is likely to share a media item of the plurality of media items during a conference call that includes the second participant. The method also includes, based on the determination, selecting a data center to host the conference call.

In an example, a method, performed by one or more computing devices includes receiving a plurality of media items over a span of time that pertain to interactions between at least a first participant and a second participant. The method also includes analyzing the media items to determine characteristics of the media items, to provide analysis results. The method also includes determining, based on at least the analysis results indicating a previous pattern of media item communication during previous conference calls, that the first participant is likely to share a media item of the plurality of media items during a conference call that includes the second participant. The method also includes, based on the determination, optimizing processing of the media streams.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIG. 1A is a block diagram illustrating an online conferencing system.

FIG. 1C is an illustration of media sharing via a second selected data center.

DETAILED DESCRIPTION OF THE EMBODIMENTS

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or a computer readable medium.

During an online conference call (a.k.a., media sharing session) different participants may have different levels of participation and/or media sharing. For example, a webcast by the CEO of a company to their employees is likely to do most of the talking/presenting. The patterns of usage/participation by the participants in a conference call are correlated, recognized, and used to select a data centers. This selection can be done both before and/or during a call. When significant patterns are recognized (e.g., heavy video sharing by one participant at every Friday afternoon meeting) there may be a better (e.g., faster, better quality, more efficient, less use of network resources) data center or media communication unit (MCU) to host the call (or the respective participants) than one that is selected based on the geography of the participants alone. Likewise, during a call, other patterns of behavior (e.g., CFO always speaks/presents after the CEO presents a slide deck,) can be correlated and recognized dynamically such that when these patterns occur, the call is hosted by a different (i.e., better) data center (e.g., one closer to the CFO once they start presenting.)

Figure 1B:
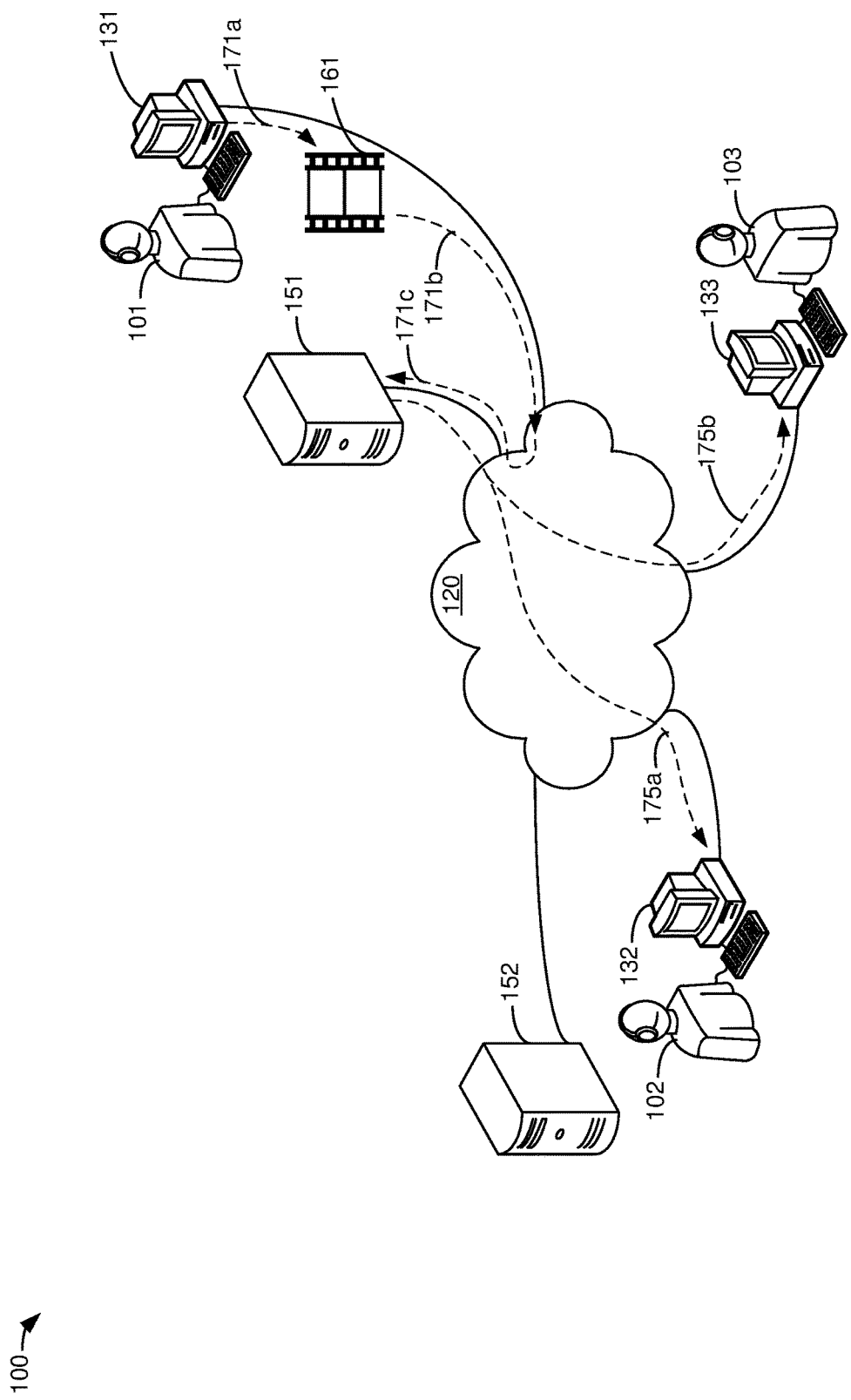
FIG. 1B is an illustration of media sharing via a first selected data center.

FIG. 1A is a block diagram illustrating an online conferencing system. In FIGS. 1A, 1B, and 1C, communication system 100 comprises participants 101-103, client devices 131-133, network 120, and data centers 151-152 (a.k.a. media communication unit—MCU). Participants 101-103 and data centers 151-152 may be located in geographically diverse locations. This is illustrated in FIG. 1A by participant 101, client device 131, and data center 151 being within an outline of New York 141; participant 102, client device 132, and data center 152 being within an outline of California 142; and, participant 103 and client device 133 being within an outline of Arizona 143.

Participants 101-103 use a software program deployed on client devices 131-133, respectively, to participate in an online conference hosted by a selected one of data centers 151-152. Client devices 131-133 are operatively coupled to network 120. Network 120 includes, or is operatively coupled to, data centers 151-152. Thus, participants 101-103, via client devices 131-133, network 120, and a selected data center 151-152 can join, leave, receive, and participate in, an online conference call. Participation in this online conference call may include various forms of media sharing including, but not limited to, audio, video, screen sharing, instant messaging, file sharing, etc.

Network 120 is a wide area communication network that can provide wired and/or wireless communication with data centers 151-152 by client devices 131-133. Network 120 and can comprise wired and/or wireless communication networks that include processing nodes, routers, gateways, physical and/or wireless data links for carrying data among various network elements, including combinations thereof, and can include a local area network, a wide area network, and an internetwork (including the Internet). Network 120 can also comprise wireless networks, including base station, wireless communication nodes, telephony switches, internet routers, network gateways, computer systems, communication links, or some other type of communication equipment, and combinations thereof. Wired network protocols that may be utilized by network 120 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Links between elements of network 120, can be, for example, twisted pair cable, coaxial cable or fiber optic cable, or combinations thereof.

Other network elements may be present in network 120 to facilitate communication but are omitted for clarity, such as base stations, base station controllers, gateways, mobile switching centers, dispatch application processors, and location registers such as a home location register or visitor location register. Furthermore, other network elements may be present to facilitate communication between among elements of conferencing system 100 which are omitted for clarity, including additional computing devices, client devices, access nodes, routers, gateways, and physical and/or wireless data links for carrying data among the various network elements.

Client devices 131-133 may be, for example, a desktop computer, a tablet computer, a laptop computer, a mobile phone, a wireless phone, a personal digital assistant (PDA), a voice over internet protocol (VoIP) phone, a voice over packet (VOP) phone, or a soft phone, as well as other types of devices or systems that execute a web browser and/or conferencing software (for example, the Skype™ app from Microsoft) in order to participate in a conference hosted by a data center 151-152. Other types of communication platforms are possible. An example device that may be, comprise, and/or include a client device 131-133 include, but are not limited to, example computer system 600 (described herein with reference to FIG. 6).

In an embodiment, conferencing system 100 selects from among data centers 151-152 an initial data center to host a conference call. During the conference call, conferencing system 10 may also re-select, from among data centers 151-152, a different data center to host the conference call. These selections may be made by one or more of data centers 151-153, an element of data centers 151-153, or another system not shown in FIGS. 1A-1C (e.g., a data center selection and/or handoff system residing at and/or coupled to a data center 151-152.) This selection is based at least in part on cognitive learning of media traffic flow before or during the conference call.

For example, the traffic flows during a call, and/or the traffic flows during previous calls with similar characteristics (e.g., participants, time/day of the meeting, meeting title, recurring meeting schedule, point in time during the meeting, etc.) may be analyzed. This analysis may correlate media flows to/from participants to the characteristics in order to recognize patterns. These patterns are used to select an initial data center 151-152, to re-select a data center, and/or assign participants 101-103 to a data center 151-152.

The inputs to the analysis may include, but are not limited to, for example, information from a collaboration graph system (e.g., Delve™ from Microsoft); 'media' profiles associated with participants (e.g., a cognitive history of a participant's conversations, participation level, app sharing, media sharing, etc.); an organizational directory graph (e.g., are the participants on the same/different committees, belong to the same/different teams, report to different organizational entities, organizational structure, etc.); the context of the media collaboration (e.g., does sharing usually occur during this meeting? when? by whom? who edits? who talks? Does talking correlate to recent/current editing/sharing? Does sharing correlate to upcoming talking/sharing/editing, etc.), and so on.

The output of the analysis may include a selected data center 151-152, a mid-call selection of a different data center 151-152, or a partitioning of participants between data centers 151-152. In an embodiment, the analysis's selection may be optimized for network 120 performance/efficiency. In another embodiment, the analysis's selection may be optimized for user experience factors (i.e., quality of service, audio/video clarity, etc.). For example, based on the analysis determining that participant 101 is likely to share a video stream, data center 151 may be selected to host the conference call. This minimizes the network 120 distance between the sharing client device 131 (which is in New York 141) and the data center 151 (which is also in New York 141) when compared to sharing via data center 152 (which is in California 142.) This selection is illustrated in FIG. 1B by a video 161 coming from client device 131 (illustrated by arrow 171*a*) going to data center 151 via network 120 (illustrated by arrows 171*b* and 171*c*). The video is distributed by data center 151 to client device 132 (illustrated by arrow 175*a*) and client device 133 (illustrated by arrow 175*b*).

In another example, the analysis's selection may partition participant's 101-103 such that participants 101-103 that have been determined to be mostly quiet (and/or don't share media) are assigned to a lightly loaded data center 152, while the talkative (and/or heavy media sharing type) of participants are assigned to data center 151. This helps optimize the processing of the media streams that are part of the conference. In another embodiment, to optimize the processing of media streams, the analysis's selection may include partitioning participant's 101-103 to MCU's and/or processors within a given data center 151-152. This type of selection is illustrated in FIG. 1C by media coming from client device 132 (illustrated by arrow 176a) and media coming from client device 133 (illustrated by arrow 176b) going to data center 152 via network 120. The media is distributed by data center 152 to client device 131 (illustrated by arrow 172).

In an embodiment, communication system configures data center 151 to host a media communication session. The selection of data center 151 is based at least in part on a participant history associated with participant 101, a participant history associated with participant 102, and a context history associated with the media communication session. The participant histories and the context history may be based at least in part on historical media flows between participant 101 and participant 102 during at least one previous media communication session. For example, if, during a previous meeting(s) with a schedule title of "Weekly Sales Update," participant 101 does much of the talking and shares slides from a presentation, and participant 102 remains mostly silent, communication system 100 may select data center 151 to host the meeting (and/or select MCUs within data center 151 to serve participant 101 and/or 102.) In another example, if, during a previous meeting(s) with a schedule title of "Meet the Boss," participant 102 does the most talking, and participant 101 remains mostly silent, communication system 100 may select data center 152 to host the meeting (and/or select MCUs within data center 152 to serve participant 101 and/or 102.)

The participant histories and the context history may be based at least in part on historical media flows between participant 101 and participant 102 during the current media communication session. For example, if, during the current meeting participant 102 does a majority of the talking and shares slides from a presentation, and participant 102 remains mostly silent, communication system 100 may select data center 152 to host the meeting (and/or select MCUs within data center 152 to serve participant 101 and/or 102.). In addition, these participant histories and the context history may be based at least in part on historical media flows between participant 101 and participant 102 during both the current media communication session and at least one previous media communication session.

The participant histories may be based on correlations between historical media flows associated with a participant and the context history. For example, the analysis may determine that previous meetings scheduled on Tuesdays often result in participant 101 sharing one or more spreadsheets with the other participants. Thus, communication system 100 may assign data center 151 to host the conference and/or share the media associated with participant 101.

The context history may be based a correlation between the first participant and historical media flows. For example, the analysis may determine that during previous meetings with "Sales" in the title, participant 101 spoke for over 50% of the time, while during previous meetings with participants on an "Engineering Team," participant 101 spoke only 1% of the time and did not share any media. Thus, communication system 100 may assign data center 151 to host the conferences and/or share the media associated with meeting having "Sales" in the title and select data center 152 to host meetings and/or share the media associated with meeting having the "Engineering Team" as participants. In another example, based a correlation between the first participant and historical media flows, communication system 100 may allocate MCUs or processors within data center 151 to serve and/or share the media associated with respective participants 101-103.

Figure 2A:
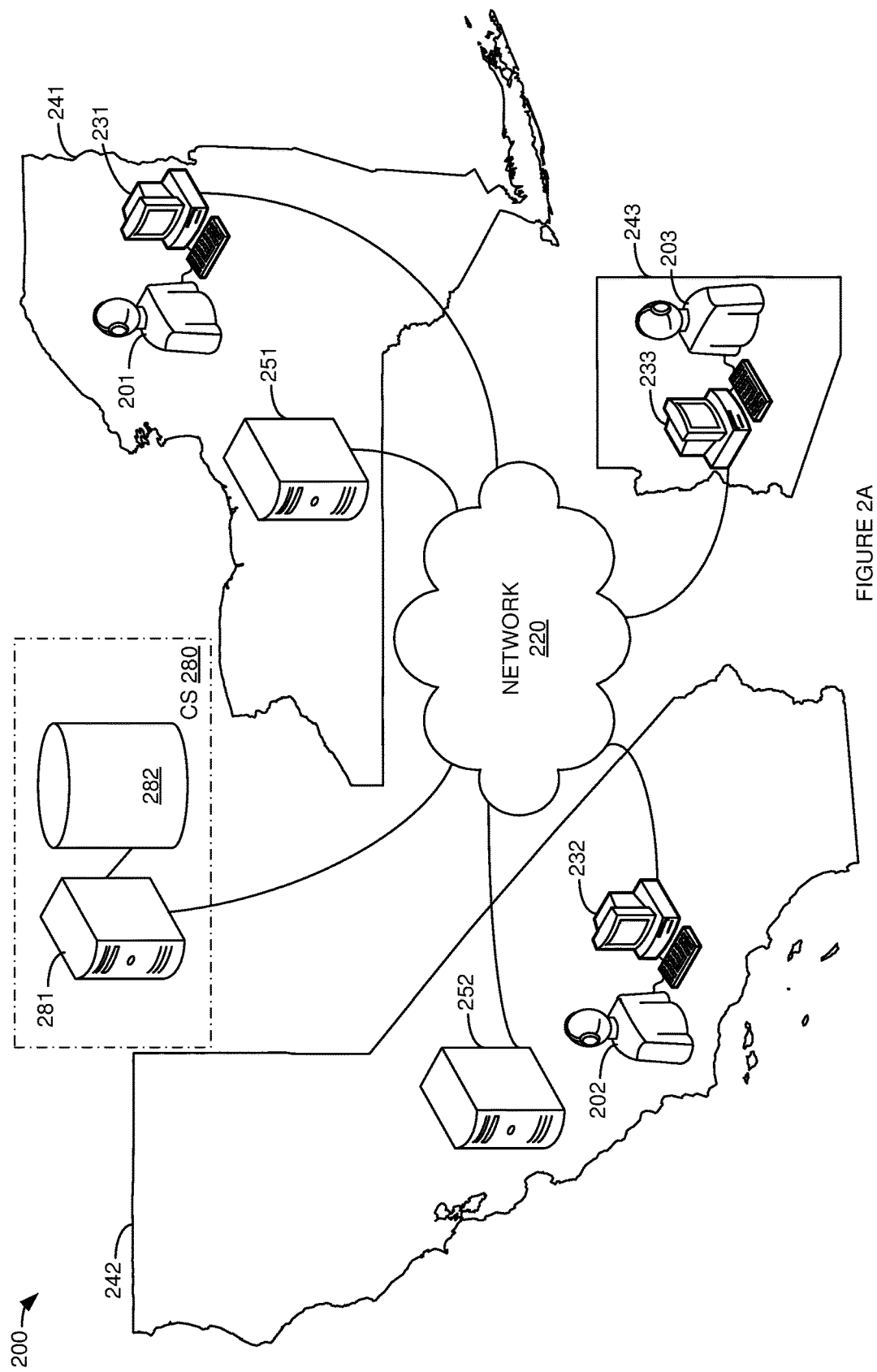
FIG. 2A is a block diagrams illustrating a communication system that utilizes a cognitive data center selection system.
Figure 2B:
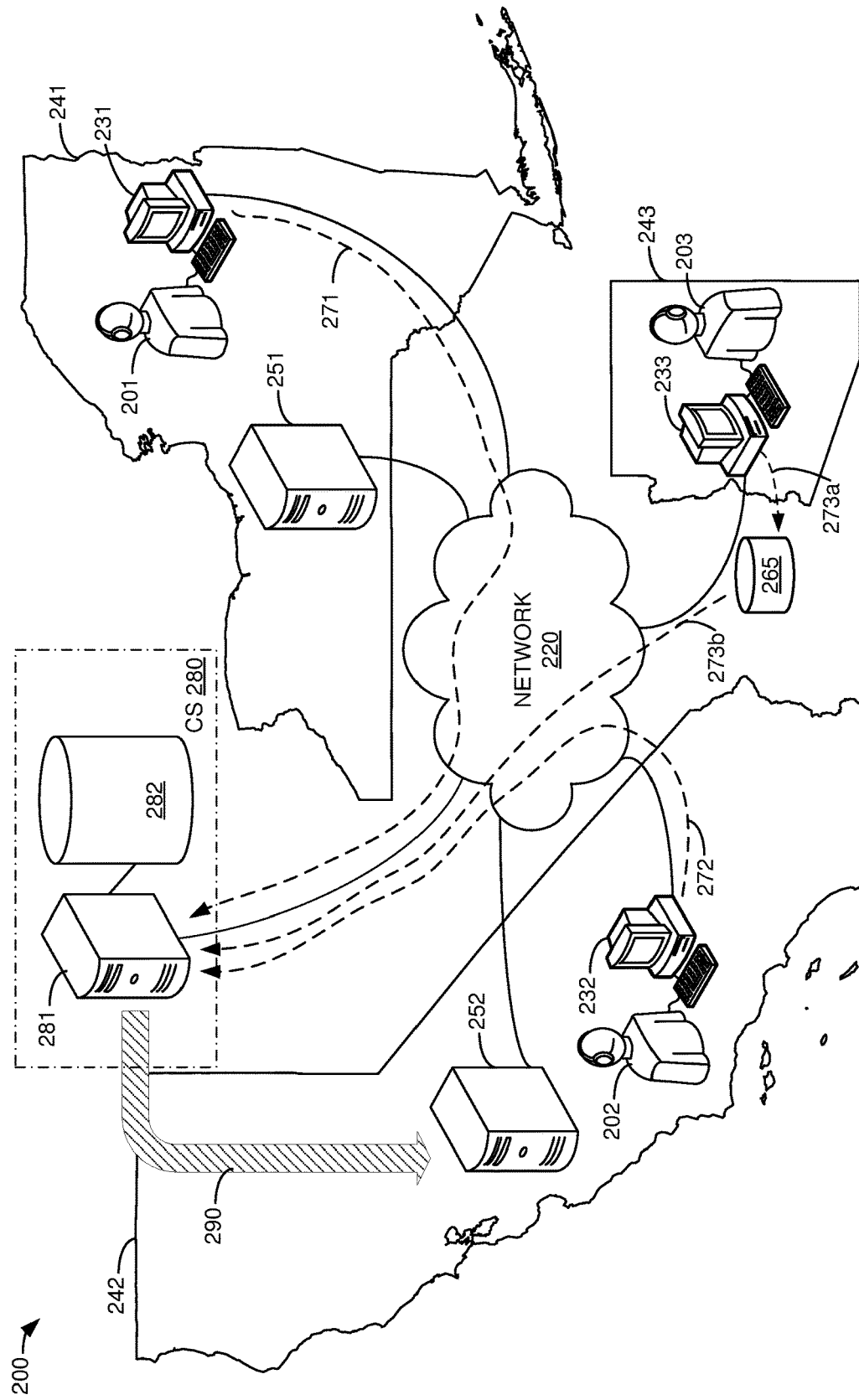
FIG. 2B is a block diagrams illustrating a cognitive system selecting a data center.

FIG. 2A is a block diagrams illustrating a communication system that utilizes a cognitive data center selection system. In FIG. 2A and FIG. 2B, communication system 200 comprises participants 201-203, client devices 231-233, network 220, data centers 251-252, and cognitive system 280. Cognitive system 280 may include computer system 281 and database 282. Participants 201-203 and data centers 251-252 may be located in geographically diverse locations. This is illustrated in FIGS. 2A and 2B by participant 201, client device 231, and data center 251 being within an outline of New York 241; participant 202, client device 232, and data center 252 being within an outline of California 242; and, participant 203 and client device 233 being within an outline of Arizona 243.

Participants 201-203 can use a software program deployed on client devices 231-233, respectively, to participate in an online conference hosted by a selected one or more of data centers 251-252. Client devices 231-233 are operatively coupled to network 220. Network 220 includes, or is operatively coupled to, data centers 251-252 and cognitive system 280. Participants 201-203, via client devices 231-233, network 220, and a selected data center 251-252 are able to join, leave, receive, and participate in, an online conference call. Participation in this online conference call may include various forms of media sharing including, but not limited to, audio, video, screen sharing, instant messaging, file sharing, etc.

Network 220 is a wide area communication network that can provide wired and/or wireless communication with data centers 251-252 and cognitive system 280 by client devices 231-233. Network 220 and can comprise wired and/or wireless communication networks that include processing nodes, routers, gateways, physical and/or wireless data links for carrying data among various network elements, including combinations thereof, and can include a local area network, a wide area network, and an internetwork (including the Internet). Network 220 can also comprise wireless networks, including base station, wireless communication nodes, telephony switches, internet routers, network gateways, computer systems, communication links, or some other type of communication equipment, and combinations thereof. Wired network protocols that may be utilized by network 220 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Links between elements of network 220, can be, for example, twisted pair cable, coaxial cable or fiber optic cable, or combinations thereof.

Other network elements may be present in network 220 to facilitate communication but are omitted for clarity, such as base stations, base station controllers, gateways, mobile switching centers, dispatch application processors, and location registers such as a home location register or visitor location register. Furthermore, other network elements may be present to facilitate communication between among elements of conferencing system 200 which are omitted for clarity, including additional computing devices, client devices, access nodes, routers, gateways, and physical and/or wireless data links for carrying data among the various network elements.

Client devices 231-233 may be, for example, a desktop computer, a tablet computer, a laptop computer, a mobile phone, a wireless phone, a personal digital assistant (PDA), a voice over internet protocol (VoIP) phone, a voice over packet (VOP) phone, or a soft phone, as well as other types of devices or systems that execute a web browser and/or conferencing software (for example, the Skype™ app from Microsoft) in order to participate in a conference hosted by a data center 251-252. Other types of communication platforms are possible. An example device that may be, comprise, and/or include a client device 231-232 include, but are not limited to, example computer system 600 (described herein with reference to FIG. 6).

In an embodiment, cognitive system 280 receives data and/or media items that pertain to the interactions between participants 201-202. Cognitive system 280 typically receives this data and/or media items over a span of time prior to a conference call that is to be hosted by a data center 151-152. This is illustrated in FIG. 2B by arrows 271-273. In particular, media item 265 is illustrated being received by cognitive system 280 by arrows 273a and 273b. Cognitive system 280 uses the received data and/or media items to select data center 152 to host a conference call. This is illustrated in FIG. 2B by arrow 290. In an embodiment, cognitive system 280 uses the received data and/or media items to select respective MCUs and/or processors within data center 152 to serve respective participants 101-103.

Cognitive system 280 analyzes the data and/or media items to determine characteristics of the media items and to provide analysis results. Based on at least these analysis results, cognitive system 280 may determine there was a previous pattern (e.g., during previous conference calls) of interaction between one or more of participants 201-203 that indicating that a media item(s) are likely to be shared at a meeting of participants 201-203. Based on determining that the previous pattern indicates a particular media item(s) are likely to be shared, cognitive system 280 selects a data center 251-252 to host a conference call.

For example, in the days or weeks prior to a meeting, cognitive system 280 may receive, from client device 233 media item 265. Media item 265 may be edited or otherwise be shared by participant 203 and participant 202 multiple times over this time period. Based on this activity, cognitive system 280 may determine that media item 265 is likely to be shared during an upcoming conference call that includes participant 202 and participant 203. This determination may be used by system 200 to select a data center 151-152 to host the conference call.

Cognitive system 280 may be, or comprise, a Media Presentation System (MPS). Typically, a MPS identifies a participant's 201-203 activity and then attempts to deliver one or more media items that are relevant to the participant's current activity. In other words, those media items that are determined to exhibit a pattern of previous participant activity that matches the participant's current activity. When used as part of system 200, cognitive system 280 uses the patterns of previous activity (and associated media items) as a basis for selecting a data center 151-152.

Cognitive system 280 collects data and media items pertaining to one or more of participants 201-203, analyzes the data and media items, and then selects a data center 251-252 based on media items or patterns of behavior determined to be relevant to selecting a data center 251-252 for a conference call. In an embodiment, cognitive system 280 collects data and media items pertaining to one or more of participants 201-203, analyzes the data and media items, and then selects an MCU or processor within a data center 151-152 based on media items or patterns of behavior.

The media items can include any type of content, or any combination of digital content types. For example, a media item can include any combination of: static image content; video content; audio content (e.g., time spent speaking or presenting); graphic content (e.g., produced by a game application, simulator, etc.); textual content, documents, presentations, and so on. Media sources may include an archive data store at which a participant 201-203 stores media items, such as a cloud-based data store. In other cases, a media source may correspond to a user's social network profile or the like at which the participant 201-203 maintains media items, and so on.

Cognitive system 280 may receive supplemental data from one or more other sources. Such data may pertain to the collected media items, but may not constitute media items per se. For example, cognitive system 280 can receive textual metadata information that describes the media items and participant 201-203 interactions that have been collected, such as by using keywords, etc. In another case, cognitive system 280 can receive user ID information which identifies participants 201-203 who may be involved with selecting, changing, and/or producing the media items, and so on. Cognitive system 280 can receive the ID information from any source which maintains this data, such as client devices 131-133 and/or data centers 151-152 that maintains ID information.

The media items received (and analyzed) by cognitive system 280 may include, but are not limited to, conference call scheduling information (e.g., time, date, participants, title, etc.), and items (e.g., documents, video, presentations, etc.) that have been edited by one or more of participants 201-203. The analysis results may include, but are not limited to: (1) information pertaining to an amount of media communication done by a participant(s) during previous conference calls (e.g., participant 201 is talkative, participant 202 is usually quiet); (2) information pertaining to type of media communication done by a participant(s) during previous conference calls (e.g., participant 201 often shares his computer desktop); (3) information pertaining to an order of media communication done by one or more participants(s) during previous conference calls (e.g., participant 202 usually only speaks after participant 201 speaks); (4) information pertaining to a profiles of one or more participants 201-203 (e.g., participant 201 is the company CEO, etc.); and, (5) information pertaining to social network interaction of (and/or between) participants 201-203 (e.g., participant 201 and participant 202 actively communicate regularly via social media).

Cognitive system 280 may store the media items, supplemental data, and/or analysis results in a data store 282. More specifically, the data store 282 can store media items for a plurality of participants and/or other users. The data store 282 may represent a remote data store (with respect to each participant 201-203) and/or plural local data stores (with respect to each participant 201-203).

Cognitive system 280 analyzes the media items and other data to provide an analysis result. Cognitive system 280 can perform content analysis on each media item and the other data to determine the characteristics of the media item and other data. Cognitive system 280 can then update an index provided in a data store 282 to reflect the results of its analysis. The index serves as a mechanism that can be used to later correlate media items that have characteristics associated with being shared during an upcoming conference call.

Cognitive system 280 can determine whether activity by one or more of participants 201-203, matches a previous pattern of user activity that indicates one or more media items may be shared during a conference. Cognitive system 280 can determine whether activity by one or more of participants 201-203, matches a previous pattern of user activity that indicates media stream or resource usage during a conference. If such a pattern is detected, then the cognitive system 280 can use this determination as a (partial or full) basis for selecting a data center 151-152 an or allocating participants to MCUs or processors. If there are no relevant patterns detected, then cognitive system 280 may rely on other factors (e.g., geography) to select a data center 151-152. Alternatively, in the absence of relevant patterns, cognitive system 280 may make a low confidence guess as to whether (and what) media items may be shared, and then select a data center 151-152 using that guess.

In an embodiment, cognitive system 280 may, based on the analysis results, develop and associate profiles to participants 201-203. This profile may include one or more weighting factors that are developed based on the received media items and/or other data. The media items and/or other data may pertain to interactions between one or more of participants 201-203. These profiles and/or weighting factors may be used to select an initial data center (e.g., data center 151) to host a conference call scheduled to have participants 201-203. The weighting factors may also be used by cognitive system 280 to determine a (weight adjusted) geographic centroid that is used to select an initial data center 151-152.

Figure 3:
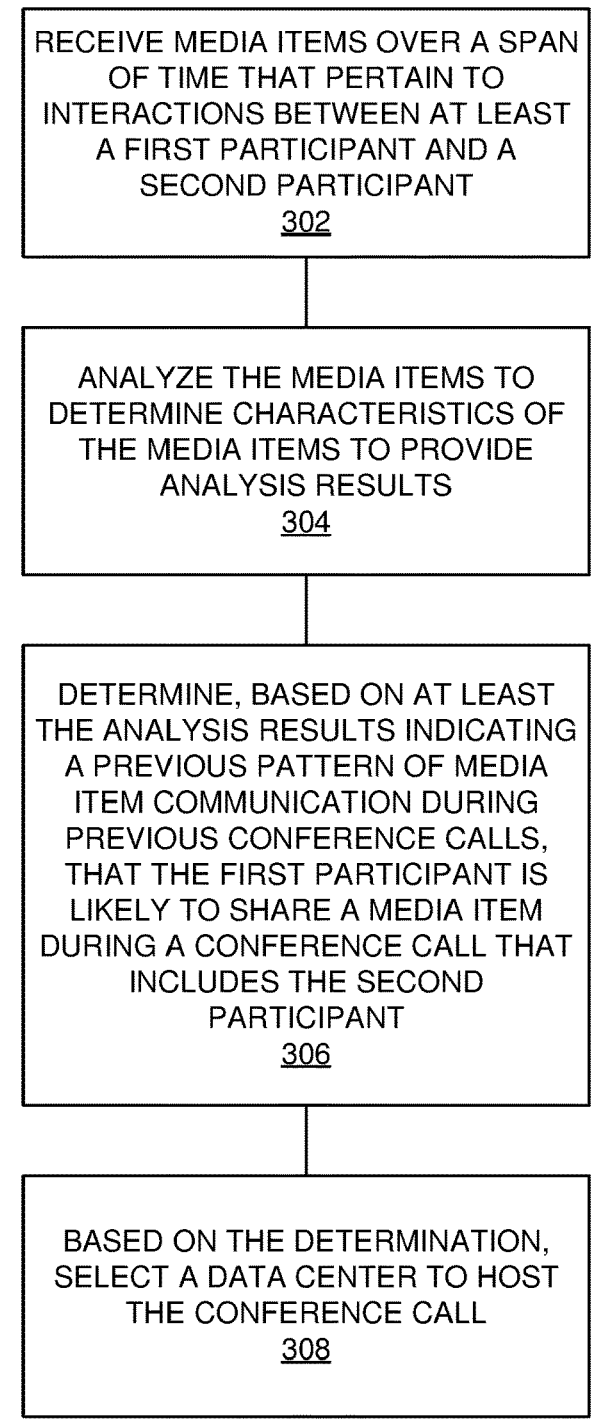
FIG. 3 is a flowchart illustrating a method of operating a communication system.

FIG. 3 is a flowchart illustrating a method of operating a communication system. The steps illustrated in FIG. 3 may be performed by one or more elements of communication system 100, communication system 200, and/or their components. Media items are received over a span of time that pertain to interactions between at least a first participant and a second participant (302). For example, cognitive system 280 may receive media items from client devices 131-133 that pertain to interactions between at least two of participants 201-203. These media items may include, but are not limited to, (a) conference call scheduling information; (b) media items (e.g., documents, video, presentations, etc.) that have been edited by one or more of participants 201-203; (c) information pertaining to an amount of media communication done by a participant(s) during previous conference calls; (d) information pertaining to type of media communication done by a participant(s) during previous conference calls; (e) information pertaining to an order of media communication done by one or more participants(s) during previous conference calls; (f) information pertaining to a profiles of one or more participants 201-203; and, (g) information pertaining to social network interaction of (and/or between) participants.

The media items are analyzed to determine characteristics of the media items to provide analysis results (304). For example, cognitive system 280 may analyze the media items looking for correlations that indicate one or more media items are likely to be shared during a conference call by one or more participants 201-203. Cognitive system 280 may analyze the media items looking for correlations that indicate one or more participants 201-203 are likely to be the source of traffic flows during a conference call (e.g., live video, talks a significant amount, instant messages a significant amount, etc.)

Based on at least the analysis results indicating a previous pattern of media item communication during previous conference calls, determine that the first participant is likely to share a media item during a conference call that includes the second participant (306). For example, based on analysis results that indicate a pattern of participant 201 sharing videos in conferences that include participant 202, cognitive system 280 may determine that participant 201 is likely to share a video during an upcoming conference call that is scheduled to include participant 202.

Based on the determination, a data center is selected to host the conference call (308). For example, based on the determination that participant 201 is likely to share a video during an upcoming conference call, cognitive system 280 may select data center 151 to host the conference call because the location of data center 151 to client device 131 will help decrease network 120 traffic.

Figure 4:
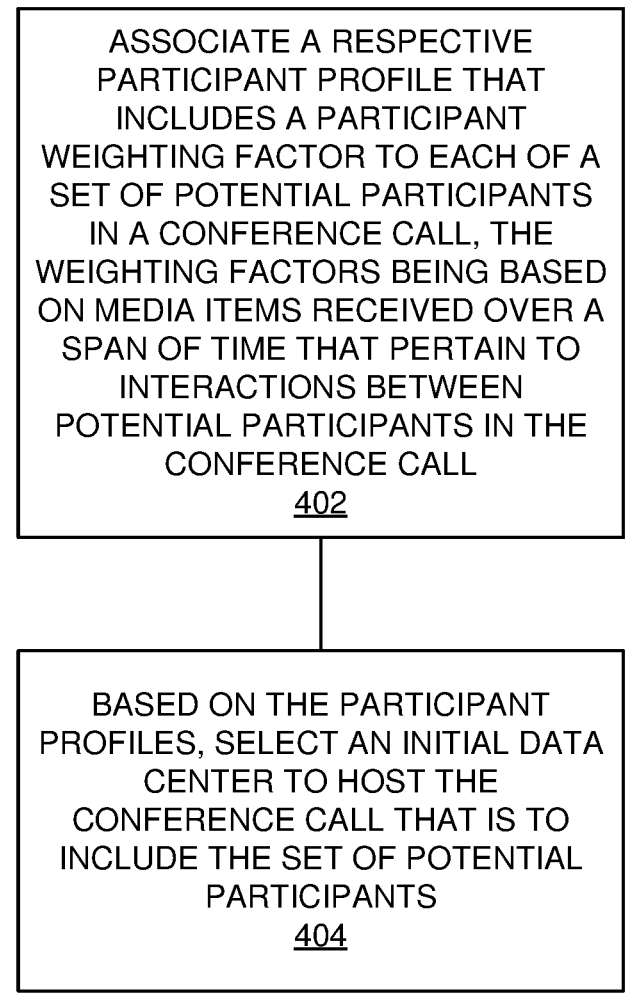
FIG. 4 is a flowchart illustrating a method of selecting a data center.

FIG. 4 is a flowchart illustrating a method of selecting a data center. The steps illustrated in FIG. 4 may be performed by one or more elements of communication system 100, communication system 200, and/or their components. A respective participant profile that includes a participant weighting factor is associated to each of a set of potential participants in a conference call, the weighting factors being based on media items received over a period of time where the media items pertain to interactions between potential participants in the conference call (402). For example, cognitive system 280 may receive media items from client devices 131-133 that pertain to interactions between at least two of participants 201-203 and use these media items to develop weighting factors to be associated with participants 201-203 who are scheduled to be on a conference call.

Based on the participant profiles, an initial data center is selected to host the conference call that is to include the set of potential participants (404). For example, the profiles and/or weighting factors developed by cognitive system 280 may be used to select an initial data center (e.g., data center 151) to host a conference call scheduled to have participants 201-203. The weighting factors may also be used by cognitive system 280 to determine a (weight adjusted) geographic centroid that is used to select an initial data center 151-152.

Figure 5:
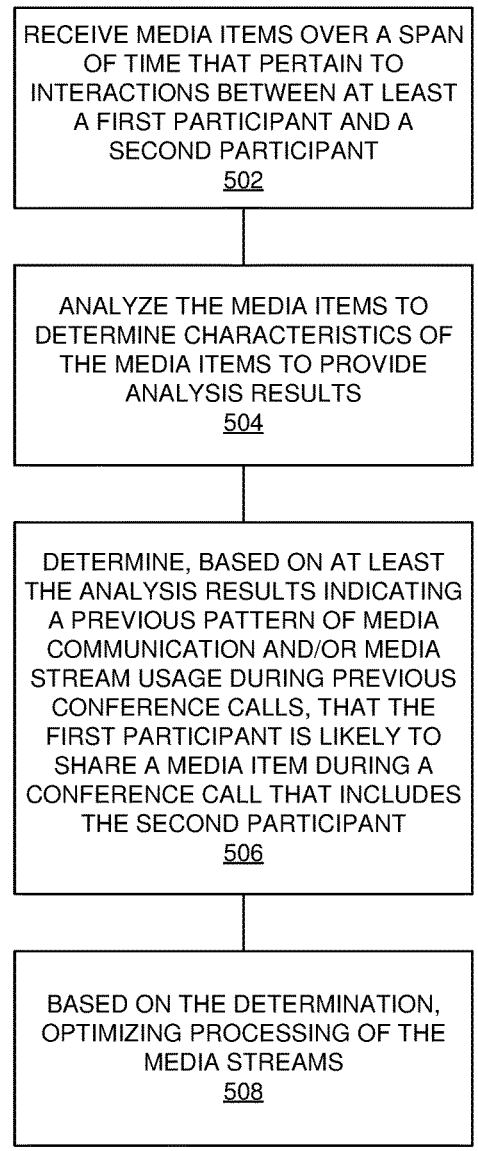
FIG. 5 is a flowchart illustrating a method of utilizing communication resources.

FIG. 5 is a flowchart illustrating a method of utilizing communication resources. The steps illustrated in FIG. 5 may be performed by one or more elements of communication system 100, communication system 200, and/or their components. Media items are received over a span of time that pertain to interactions between at least a first participant and a second participant (502). For example, cognitive system 280 may receive media items from client devices 131-133 that pertain to interactions between at least two of participants 201-203. These media items may include, but are not limited to, (a) conference call scheduling information; (b) media items (e.g., documents, video, presentations, etc.) that have been edited by one or more of participants 201-203; (c) information pertaining to an amount of media communication done by a participant(s) during previous conference calls; (d) information pertaining to type of media communication done by a participant(s) during previous conference calls; (e) information pertaining to an order of media communication done by one or more participants(s) during previous conference calls; (f) information pertaining to a profiles of one or more participants 201-203; and, (g) information pertaining to social network interaction of (and/or between) participants.

The media items are analyzed to determine characteristics of the media items to provide analysis results (504). For example, cognitive system 280 may analyze the media items looking for correlations that indicate one or more media items are likely to be shared during a conference call by one or more participants 201-203. Cognitive system 280 may analyze the media items looking for correlations that indicate one or more participants 201-203 are likely to be the source of traffic flows during a conference call (e.g., live video, talks a significant amount, instant messages a significant amount, etc.)

Based on at least the analysis results indicating a previous pattern of media communication and/or media stream usage during previous conference calls, determine that the first participant is likely to share a media item during a conference call that includes the second participant (506). For example, based on analysis results that indicate a pattern of participant 201 speaking often in conferences that include participant 202, while participant 202 does not speak very often, cognitive system 280 may determine that participant 201 is likely to use a lot of audio streaming bandwidth during an upcoming conference call that is scheduled to include participant 202.

Based on the determination, the processing of the media streams is optimized (508). For example, based on the determination that participant 201 is likely to use a significant amount of media stream bandwidth during an upcoming conference call, cognitive system 280 may select a particular MCU to serve participant 201 and a different MCU to serve participant 202. In other words, there can be cases where within the same data center (which may have already been selected according to the teachings given herein) there are multiple MCUs, or a single MCU with multiple processors. Rather than allocate (or waste) MCU processing on quiet users, cognitive system 280 may allocate most of the processing power to the busy talkers. In another example, cognitive system 280 may allocate talkative users to a first MCU within data center 151 and quiet users to a second MCU within data center 151.

Figure 6:
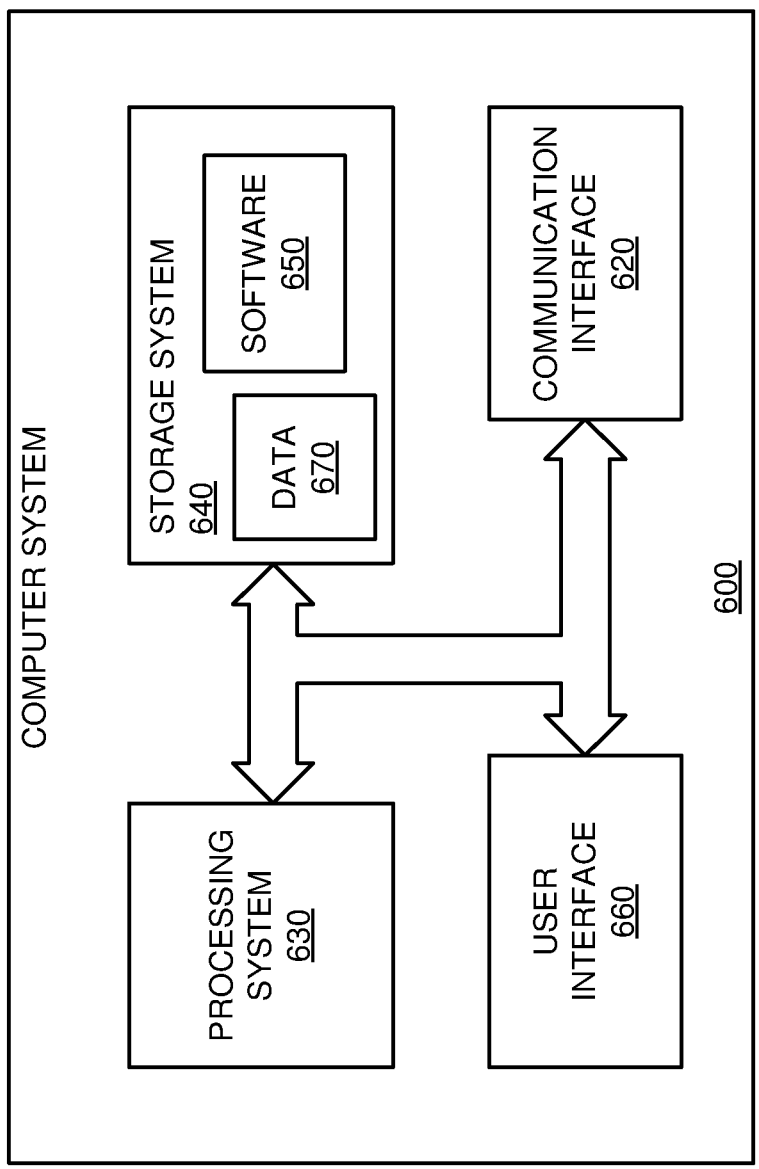
FIG. 6 is a block diagram illustrating a computer system.

FIG. 6 is a block diagram illustrating a computer system. In an embodiment, computer system 600 and/or its components include circuits, software, and/or data that implement, or are used to implement, the methods, systems and/or devices illustrated in the Figures, the corresponding discussions of the Figures, and/or are otherwise taught herein. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of communication system 100, communication system 200, and/or their components. These software descriptions may be: behavioral, register transfer, logic component, transistor, and layout geometry-level descriptions.

Data formats in which such descriptions may be implemented are stored on a non-transitory computer readable medium include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Physical files may be implemented on non-transitory machine-readable media such as: 4 mm magnetic tape, 8 mm magnetic tape, 3½-inch floppy media, CDs, DVDs, hard disk drives, solid-state disk drives, solid-state memory, flash drives, and so on.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), multi-core processors, graphics processing units (GPUs), etc.

FIG. 6 illustrates a block diagram of an example computer system. Computer system 600 includes communication interface 620, processing system 630, storage system 640, and user interface 660. Processing system 630 is operatively coupled to storage system 640. Storage system 640 stores software 650 and data 670. Processing system 630 is operatively coupled to communication interface 620 and user interface 660. Computer system 600 may comprise a programmed general-purpose computer. Computer system 600 may include a microprocessor. Computer system 600 may comprise programmable or special purpose circuitry. Computer system 600 may be distributed among multiple devices, processors, storage, and/or interfaces that together comprise elements 620-670.

Communication interface 620 may comprise a network interface, modem, port, bus, link, transceiver, or other communication device. Communication interface 620 may be distributed among multiple communication devices. Processing system 630 may comprise a microprocessor, microcontroller, logic circuit, or other processing device. Processing system 630 may be distributed among multiple processing devices. User interface 660 may comprise a keyboard, mouse, voice recognition interface, microphone and speakers, graphical display, touch screen, or other type of user interface device. User interface 660 may be distributed among multiple interface devices. Storage system 640 may comprise a disk, tape, integrated circuit, RAM, ROM, EEPROM, flash memory, network storage, server, or other memory function. Storage system 640 may include computer readable medium. Storage system 640 may be distributed among multiple memory devices.

Processing system 630 retrieves and executes software 650 from storage system 640. Processing system 630 may retrieve and store data 670. Processing system 630 may also retrieve and store data via communication interface 620. Processing system 650 may create or modify software 650 or data 670 to achieve a tangible result. Processing system may control communication interface 620 or user interface 660 to achieve a tangible result. Processing system 630 may retrieve and execute remotely stored software via communication interface 620.

Software 650 and remotely stored software may comprise an operating system, utilities, drivers, networking software, and other software typically executed by a computer system. Software 650 may comprise an application program, applet, firmware, or other form of machine-readable processing instructions typically executed by a computer system. When executed by processing system 630, software 650 or remotely stored software may direct computer system 600 to operate as described herein.

Implementations discussed herein include, but are not limited to, the following examples:

Example 1

A communication system, comprising: a first data center of a plurality of data centers configured to host a media communication session; and, a selection system to, based at least in part on a first participant history associated with a first participant in the media communication session, a second participant history associated with a second participant in the media communication session, and a context history associated with the media communication session, select the first data center to host the media communication session.

Example 2

The system of claim 1, wherein at least one of the first participant history, the second participant history, and the context history are based at least in part on historical media flows between the first participant and the second participant during at least one previous media communication session.

Example 3

The system of claim 1, wherein at least one of the first participant history, the second participant history, and the context history are based at least in part on historical media flows between the first participant and the second participant during the media communication session.

Example 4

The system of claim 1, wherein at least one of the first participant history, the second participant history, and the context history are based at least in part on historical media flows between the first participant and the second participant during at least one previous media communication session and the media communication session.

Example 6

The system of claim 1, wherein the first participant history is based at least in part on a first correlation between first historical media flows associated with the first participant and the context history.

Example 6

The system of claim 1, wherein the context history is based at least in part on a first correlation between the first participant and historical media flows.

Example 7

A method, performed by one or more computing devices, comprising: receiving a plurality of media items over a span of time that pertain to interactions between at least a first participant and a second participant; analyzing the media items to determine characteristics of the media items, to provide analysis results; determining, based on at least the analysis results indicating a previous pattern of media item communication during previous conference calls, that the first participant is likely to share a media item of the plurality of media items during a conference call that includes the second participant; and, based on the determination, selecting a data center to host the conference call.

Example 8

The method of claim 7, wherein the plurality of media items includes conference call scheduling information.

Example 9

The method of claim 7, wherein the plurality of media items includes documents that have been edited by at least the first participant and the second participant.

Example 10

The method of claim 7, wherein the analysis results include information pertaining to an amount of media communication done by the first participant during previous conference calls.

Example 11

The method of claim 7, wherein the analysis results include information pertaining to a type of media communication done by the first participant during previous conference calls.

Example 12

The method of claim 7, wherein the analysis results include information pertaining to an order of media communication done by the first participant and the second participant during previous conference calls.

Example 13

The method of claim 7, wherein the analysis results include information pertaining to a first profile associated with the first participant and a second profile

Example 14

The method of claim 7, wherein the analysis results include information pertaining to social network interaction of the first participant.

Example 15

A non-transitory computer readable medium having instructions stored thereon for selecting data centers that, when executed by a computer, at least instruct the computer to: associate a respective participant profile that includes a respective participant weighting factor to each of a set of potential participants in a conference call, the respective weighting factors being based on a plurality of media items received over a span of time that pertain to interactions between at least a first participant and a second participant of the set of potential participants in the conference call; and, select, from among a plurality of data centers, an initial data center to host a conference call having participants on the conference call that include the set of potential participants, the selection being based at least in part on a first participant profile associated with a first participant and a second participant profile associated with a second participant.

Example 16

The computer readable medium of claim 15, wherein the plurality of media items that pertain to interactions between the first participant and the second participant include media shared by the first participant during at least one previous conference call.

Example 17

The computer readable medium of claim 16, wherein the computer is further instructed to: determine a centroid using the participant weighting factors in the participant profiles, the selection of the initial data center being based on the first centroid.

Example 18

The computer readable medium of claim 17, wherein the plurality of media items includes conference call scheduling information.

Example 19

The computer readable medium of claim 17, wherein the plurality of media items includes documents that have been edited by at least the first participant and the second participant.

Example 20

The method of claim 17, wherein the respective participant weighting factors are based at least in part on respective amounts of media communication done by the respective participants during previous conference calls.

Example 21

A method, performed by one or more computing devices, comprising: receiving a plurality of media items over a span of time that pertain to interactions between at least a first participant and a second participant; analyzing the media items to determine characteristics of the media items, to provide analysis results; determining, based on at least the analysis results indicating a previous pattern of media item communication during previous conference calls, that the first participant is likely to share a media item of the plurality of media items during a conference call that includes the second participant; and, based on the determination, optimizing processing of the media streams.

Example 22

The method of example 21, wherein the analysis results include information pertaining to an amount of media communication done by the first participant during previous conference calls.

Example 23

The method of example 21, wherein the plurality of media items that pertain to interactions between the first participant and the second participant include media shared by the first participant during at least one previous conference call.

Example 24

The method of example 22, wherein the plurality of media items includes conference call scheduling information.

Example 25

The method of example 22, wherein the plurality of media items includes conference call scheduling information.

Example 26

The method of example 22, wherein the plurality of media items includes documents that have been edited by at least the first participant and the second participant.

The foregoing descriptions of the disclosed embodiments have been presented for purposes of illustration and description. They are not intended to be exhaustive or to limit the scope of the claimed subject matter to the precise form(s) disclosed, and other modifications and variations may be possible in light of the above teachings. The embodiments were chosen and described in order to best explain the principles of the disclosed embodiments and their practical application to thereby enable others skilled in the art to best utilize the various embodiments and various modifications as are suited to the particular use contemplated. It is intended that the appended claims be construed to include other alternative embodiments except insofar as limited by the prior art.

What is claimed is:

1. A device for selecting a data center to host a communication session, comprising:
   a processor; and
   a memory in communication with the processor, the memory comprising executable instructions that, when executed by the processor, cause the processor to control the device to perform functions of:
   monitoring, over a span of time, a plurality of interactions involving first and second participants via a communication network, the plurality of interactions including sharing of a plurality of media items between the first and second participants;
   determining, based on the media items shared during the plurality of interactions, a media sharing pattern of the plurality of interactions;
   detecting a communication session involving the first and second participants via the communication network;
   determining, based on the determined media sharing pattern, that the first participant is likely to share a media item of the during the detected communication session;
   based on the determination that the first participant is likely to share a media item during the detected communication session, selecting, from a plurality of data centers available for hosting the communication session, a first data center as being more preferable than other data centers for the first participant to share a media; and
   causing the first data center to host the communication session.

2. The device of claim 1, wherein the plurality of media items includes communication session scheduling information.

3. The method device of claim 1, wherein the plurality of media items includes documents that have been edited by the first or second participant.

4. The device of claim 1, wherein the media sharing pattern is determined based on an amount of the media items shared by the first or second participant during the plurality of interactions.

5. The device of claim 1, wherein the media sharing pattern is determined based on a media type of each media items shared by the first or second participant during the plurality of interactions.

6. The device of claim 1, wherein the media sharing pattern is determined based on an order of the media items shared by the first or second participant during the plurality of interactions.

7. The device of claim 1, wherein the media sharing pattern is determined based on a profile associated with the first or second participant, the profile includes a conversation history or participation level of the first or second participant.

8. The device of claim 1, wherein the media sharing pattern is determined based on social network interactions of the first or second participant.

9. The device of claim 1, wherein the media sharing pattern is determined based on historical media flows during the plurality of interactions.

10. The device of claim 1, wherein, for selecting the first data center as being more preferable than other data centers, the instructions, when executed by the processor, further cause the processor to control the device to perform a function of selecting the first data center based on a geographical proximity of each data center to a remote device associated with the first participant.

11. A method of operating a device for selecting a data center to host a communication session, the method comprising:
monitoring, over a span of time, a plurality of interactions involving first and second participants via a communication network, the plurality of interactions including sharing of a plurality of media items between the first and second participants;
determining, based on the media items shared during the plurality of interactions, a media sharing pattern of the plurality of interactions;
detecting a communication session involving the first and second participants via the communication network;
determining, based on the determined media sharing pattern, that the first participant is likely to share a media item during the detected communication session;
based on the determination that the first participant is likely to share a media item during the detected communication session, selecting, from a plurality of data centers available for hosting the communication session, a first data center as being more preferable than other data centers for the first participant to share a media; and
causing the first data center to host the communication session.

12. The method of claim 11, wherein the plurality of media items includes communication session scheduling information.

13. The method of claim 11, wherein the plurality of media items includes documents that have been edited by the first or second participant.

14. The method of claim 11, wherein the media sharing pattern is determined based on an amount of the media items shared by the first or second participant during the plurality of interactions.

15. The method of claim 11, wherein the media sharing pattern is determined based on a media type of each media item shared by the first or second participant during the plurality of interactions.

16. The method of claim 11, wherein the media sharing pattern is determined based on an order of the media items shared by the first or second participant during the plurality of interactions.

17. The method of claim 11, wherein the media sharing pattern is determined based on a profile associated with the first or second participant, the profile includes a conversation history or participation level of the first or second participant.

18. The method of claim 11, wherein the media sharing pattern is determined based on historical media flows during the plurality of interactions.

19. The method of claim 11, wherein selecting the first data center as being more preferable than other data centers comprises selecting the first data center based on a geographical proximity of each data center to a remote device associated with the first participant.

20. A non-transitory computer readable medium containing instructions which, when executed by a processor, cause a computer to perform functions of:
monitoring, over a span of time, a plurality of interactions involving first and second participants via a communication network, the plurality of interactions including sharing of a plurality of media items between the first and second participants;
determining, based on the media items shared during the plurality of interactions, a media sharing pattern of the plurality of interactions;
detecting a communication session involving the first and second participants via the communication network;
determining, based on the determined media sharing pattern, that the first participant is likely to share a media item during the detected communication session;
based on the determination that the first participant is likely to share a media item during the detected communication session, selecting, from a plurality of data centers available for hosting the communication session, a first data center as being more preferable than other data centers for the first participant to share a media; and
causing the first data center to host the communication session.

* * * * *